United States Patent
Bai

(10) Patent No.: US 11,855,453 B1
(45) Date of Patent: Dec. 26, 2023

(54) METHOD FOR CALCULATING GROSS PRIMARY PRODUCTIVITY OF ECOSYSTEM

(71) Applicant: Institute of Atmospheric Physics, Chinese Academy of Sciences, Beijing (CN)

(72) Inventor: Jianhui Bai, Beijing (CN)

(73) Assignee: Institute of Atmospheric Physics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 18/342,655

(22) Filed: Jun. 27, 2023

(30) Foreign Application Priority Data

Oct. 21, 2022 (CN) .......................... 202211293555.0

(51) Int. Cl.
*G06F 30/20* (2020.01)
*H02J 3/00* (2006.01)
*G06F 119/22* (2020.01)

(52) U.S. Cl.
CPC .............. *H02J 3/004* (2020.01); *G06F 30/20* (2020.01); *G06F 2119/22* (2020.01);
(Continued)

(58) Field of Classification Search
CPC ........ G06F 30/20; G01P 13/025; G01P 5/165; G01P 13/02; G01P 5/14; G01P 5/16;
(Continued)

(56) References Cited

U.S. PATENT DOCUMENTS

| | | | |
|---|---|---|---|
| 2003/0136174 A1* | 7/2003 | Edwards | .............. G01N 1/2294 73/863.52 |
| 2011/0101239 A1 | 5/2011 | Woodhouse | |
| 2022/0061236 A1* | 3/2022 | Guan | ....................... A01G 7/00 |

FOREIGN PATENT DOCUMENTS

| | | | |
|---|---|---|---|
| CN | 106446564 A | | 2/2017 |
| CN | 110276304 A | * | 9/2019 |

(Continued)

OTHER PUBLICATIONS

Su et al. "Study on the variation of light use efficiency on STIPA Baicalansis Meadow—Steppe in Hulunber" Chinese Journal of Agricultural Resources and Regional Planning, vol. 34, No. 5, pp. 27-31 Oct. 2013. (English Abstract).

(Continued)

*Primary Examiner* — Andre J Allen
(74) *Attorney, Agent, or Firm* — Kaplan Breyer Schwarz, LLP; Stuart H. Mayer

(57) ABSTRACT

A method for calculating a gross primary productivity of an ecosystem is provided. The application belongs to a technical field of gross primary productivity calculation, and includes: acquiring key parameters of the ecosystem and screening out standard parameters, where the key parameters include a gross primary productivity, a solar altitude angle and an atmospheric column material content; calculating factor parameter terms based on the standard parameters and ground water vapor pressure parameters; where the factor parameter terms include a photochemical term, a scattering term and a gross primary productivity term; and based on the factor parameter terms, acquiring a calculation model of a gross primary productivity through an energy balance principle of a photosynthetically active radiation; through the calculation model, acquiring a calculated value of the gross primary productivity of the ecosystem.

6 Claims, 1 Drawing Sheet

(52) U.S. Cl.
CPC ....... *H02J 2203/20* (2020.01); *H02J 2300/24* (2020.01); *Y02A 90/10* (2018.01)

(58) Field of Classification Search
CPC ...... G01P 5/00; G01P 5/02; G01P 5/12; G01P 5/245; G01P 21/025; G01P 5/07; G01P 5/04; G01P 1/02; G01P 1/08; G01P 5/10; G01P 5/06; G01P 5/18; G01P 5/26; G01P 13/045; G01P 5/005; G01P 5/08; G01P 21/00; G01P 3/62; G01P 5/175; G01P 5/24; G01P 15/00; G01P 15/036; G01P 5/006; G01P 5/083; G01P 5/086; G01P 5/241; G01P 7/00; G01P 5/001; Y02A 90/10

See application file for complete search history.

(56) References Cited

FOREIGN PATENT DOCUMENTS

| CN | 114331233 A |   | 4/2022  |
|----|-------------|---|---------|
| CN | 115310757 A | * | 11/2022 |
| CN | 115952702 A | * | 4/2023  |

OTHER PUBLICATIONS

Wu et al. "Gross primary production estimation from MODIS data with vegetation index and photosynthetically active radiation in maize" Journal of Geophysical Research, vol. 115, D12127.

Xu et al. "Model Optiminzation and GPP Estimation of Light Energy Utilization in Subtropical Evergreen Coniferous Forest" Forest Engineering vol. 37 No. 5 Sep. 2021.

\* cited by examiner

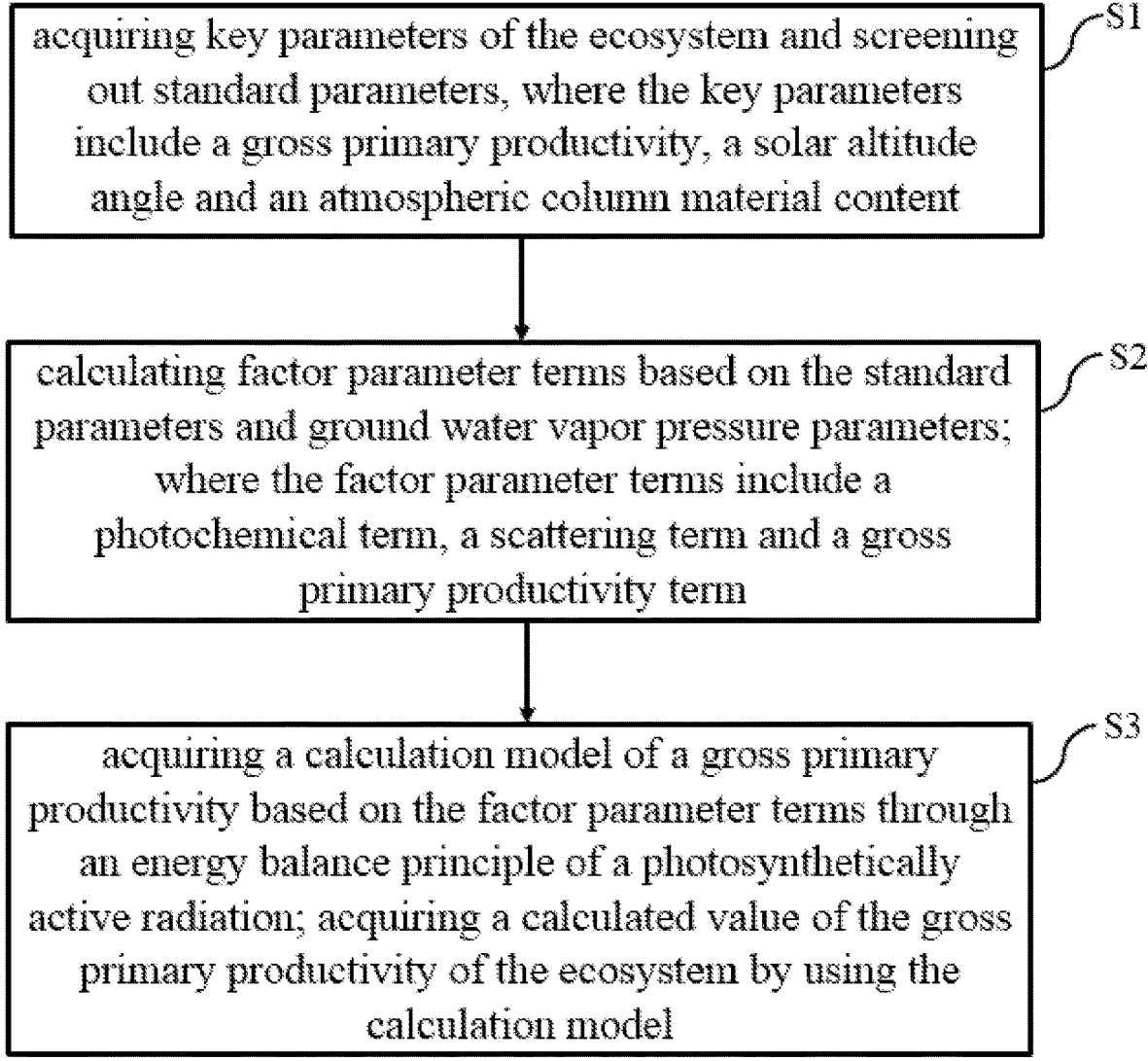

METHOD FOR CALCULATING GROSS PRIMARY PRODUCTIVITY OF ECOSYSTEM

CROSS-REFERENCE TO RELATED APPLICATIONS

This application claims priority to Chinese Patent Application No. 202211293555.0, filed on Oct. 21, 2022, the contents of which are hereby incorporated by reference.

TECHNICAL FIELD

The application belongs to a technical field of gross primary productivity calculation, and in particular to a method for calculating a gross primary productivity of an ecosystem.

BACKGROUND

At present, calculation models of a gross primary productivity of the ecosystem at home and abroad may be mainly classified into two categories: 1) complex models, considering various detailed processes and descriptions of energy, carbon, nitrogen, water circulation and storage in plants and soil, involving many parameters and adopting a lot of assumptions and corresponding parameters; and 2) empirical models, which are too simplistic and insufficient when considering many processes such as energy, carbon, nitrogen, water circulation and storage in plants and soil, considering many processes of the energy, the carbon, the nitrogen, the water circulation and the storage in plants and soil, and cannot fully and reasonably capture and describe the detailed process of gross primary productivity of the ecosystem and its interaction mechanism.

In the prior art, there is a great uncertainty in the calculation of a gross primary productivity of the ecosystem, and all the models describe the action in one direction, that is, there is a lack of interaction, especially interactions and expressions between multiple factors and multiple processes.

SUMMARY

The purpose of the application is to provide a method for calculating a gross primary productivity of an ecosystem, so as to solve problems existing in the prior art.

In order to achieve the above purpose, the application provides a method for calculating the gross primary productivity of the ecosystem, including following steps:

acquiring key parameters of the ecosystem and screening out standard parameters, where the key parameters include a gross primary productivity, a solar altitude angle and an atmospheric column material content;

calculating factor parameter terms based on the standard parameters and ground water vapor pressure parameters; where the factor parameter terms include a photochemical term, a scattering term and a gross primary productivity term; and acquiring a calculation model of a gross primary productivity based on the factor parameter terms through an energy balance principle of a photosynthetically active radiation;

acquiring a calculated value of the gross primary productivity of the ecosystem by using the calculation model.

Optionally, a process of acquiring the key parameters of the ecosystem includes:

acquiring variation laws and actual measurement data of photosynthetically active radiation parameters, meteorological parameters and gross primary productivity parameters, and selecting value intervals of the key parameters and parameters of an atmospheric state to acquire the key parameters of the ecosystem, where the atmospheric column material content is a quantitative value of the atmospheric state.

Optionally, the atmospheric state includes a first atmospheric state and a second atmospheric state, where the first atmospheric state is an atmospheric column material content less than 0.5, and the second atmospheric state is an atmospheric column material content greater than or equal to 0.5.

Optionally, a process of screening out the standard parameters includes:

screening out the standard parameters according to screening conditions; where the screening conditions include the gross primary productivity data with a standard deviation less than 2 times; the solar altitude angle higher than 15 degrees; and a measured value of the photosynthetically active radiation less than a value of a top of an atmosphere.

Optionally, a process of calculating the factor parameter terms includes:

calculating the photochemical term based on the solar altitude angle and the ground water vapor pressure parameters; calculating the scattering term based on the atmospheric column material content; and calculating the gross primary productivity term based on the gross primary productivity.

Optionally, a process of acquiring the calculation model of the gross primary productivity includes:

acquiring a quantitative relationship between the photosynthetically active radiation on a horizontal plane above a canopy and the factor parameter terms according to the energy balance principle of the photosynthetically active radiation, and acquiring the calculation model of the gross primary productivity by a transformation based on the quantitative relationship.

Optionally, a process of acquiring the calculated value of the gross primary productivity of the ecosystem by using the calculation model includes:

calculating the gross primary productivity of the ecosystem based on the first atmospheric state and the second atmospheric state respectively by the calculation model.

Optionally, after acquiring the calculated value of the gross primary productivity of the ecosystem, following steps are further included:

acquiring a calculation deviation between a calculated value of the gross primary productivity and the actual measurement data by using the calculation model; judging the calculation deviation, if the calculation deviation is greater than a preset value, re-screening standard parameters; and if the calculated deviation is less than or equal to the preset value, acquiring the gross primary productivity of the ecosystem.

The application has following technical effects:

The application obtains the key parameters of the ecosystem and selects the standard parameters, calculates the factor parameter terms through the standard parameters; acquires the calculation model of gross primary productivity based on the factor parameter terms and according to the energy balance principle of the photosynthetically active radiation; and acquires the calculated value of the gross primary productivity of the ecosystem by using the calculation model.

By the calculation model, the application may properly describe and reveal the main process involved in the change of gross primary productivity of the ecosystem and the complex mechanism of their interaction according to a principle of energy utilization, and clearly reveal a complex interrelationship between the gross primary productivity and control factors such as photosynthetically active radiation, water vapor and scattered radiation. The calculation method of the application is easy to be applied to all kinds of ecosystems, and a more accurate gross primary productivity of the ecosystem is acquired by using the daily measurement data of experiment station and the calculation model of the gross primary productivity.

BRIEF DESCRIPTION OF THE DRAWING

An accompanying drawing, constituting a part of this application, is used to provide a further understanding of this application. The illustrative embodiments of this application and their descriptions are used to explain this application, and do not constitute an improper limitation of this application. In the attached drawing:

FIG. 1 is a flow chart of a method in an embodiment of the present application.

DETAILED DESCRIPTION

It should be noted that embodiments in this application and features in the embodiments may be combined with each other without conflicts. The application is described in detail below with reference to the attached drawings and in conjunction with embodiments.

It should be noted that the steps shown in the flowchart of the accompanying drawing may be executed in a computer system such as a set of computer-executable instructions, and although the logical order is shown in the flowchart, in some cases, the steps shown or described may be executed in a different order from here.

Embodiment 1

As shown in FIG. 1, this embodiment provides a method for calculating a gross primary productivity of an ecosystem, including:

S1, acquiring key parameters of an ecosystem and screening out standard parameters, where the key parameters include a gross primary productivity, a solar altitude angle and an atmospheric column material content;

S2, calculating factor parameter terms based on the standard parameters; where the factor parameter terms include a photochemical term, a scattering term and a gross primary productivity term; and S3, acquiring a calculation model of a gross primary productivity based on the factor parameter terms through an energy balance principle of the photosynthetically active radiation; acquiring a calculated value of the gross primary productivity of the ecosystem using the calculation model.

Specific calculation steps include:

According to variation laws of key parameters such as photosynthetically active radiation (PAR), meteorology (temperature and humidity, ground water vapor pressure) and gross primary productivity and actual measurement data, selecting value intervals of gross primary productivity, solar altitude angle (h), atmospheric column material content (S/Q) and atmospheric state to determine each coefficient in the calculation model.

Screening the above important data in following criteria: 1) selecting data with a standard deviation less than 2 times for the gross primary productivity; 2) selecting the solar altitude angle higher than 15 degrees; and 3) a measured value of PAR should be less than that of a top of an atmosphere (this value may be obtained by using internationally recognized radiation data in visible light band, which is about 531.5 $Wm^{-2}$); all other parameters are synchronized with the above data standards.

Treatments of S/Q: dividing the atmospheric state (expressed quantitatively by S/Q) into two categories for treating, that is, 1) S/Q<0.5, and 2) S/Q≥0.5.

After screening the above parameters in turn, calculating the photochemistry, the scattering and the gross primary productivity related to PAR transmission, and determining a gross primary productivity calculation model by using a principle of PAR energy balance, that is, determining coefficients and constants of the calculation model.

The calculations are as follows:

Calculation of a photochemical term ($e^{-kwm}$): $e^{-kwm}=1-\Delta S I_0 \cos Z$;

where a solar constant $I_0=1367$ $Wm^{-2}$, Z is a solar zenith angle (degrees), $\Delta S = 0.172$ (mW×0.1×60)$^{0.303}$ (calcm$^{-2}$ min$^{-1}$), k is a water vapor absorption coefficient (m$^{-1}$), m is an atmospheric mass, and W is an atmospheric column water vapor content (W=0.21 E), E is a surface water vapor pressure (hPa).

Calculation of a scattering term ($e^{-S/Q}$): $e^{-S/Q}$, S and Q are a diffuse solar radiation and a global solar radiation ($Wm^{-2}$) respectively.

Calculation of a gross primary productivity term: $e^{-a_1 GPPtm}$, $a_1$ is an attenuation coefficient (set to 1), and GPP is the gross primary productivity (mgCO$_2$ m$^{-2}$ s$^{-1}$); a sampling time t is 60 minutes.

Based on the principle of PAR energy balance, a quantitative relationship (3-factor model) between PAR and the gross primary productivity term, the photochemistry term and the scattering term in the horizontal plane above a canopy is established;

$$PAR = A_1 e^{-a_1 GPPtm} \times \cos(Z) + A_2 e^{-kwm} \times \cos(Z) + A_3 e^{-S/Q} + A_0 \quad (1)$$

where coefficients $A_1$, $A_2$ and $A_3$ respectively represent values at the top of the atmosphere related to processes of gross primary productivity, photochemistry and scattering, and $A_0$ is PAR reflected by the top of the atmosphere.

Formula (1) is transformed to acquire a calculation model (3-factor model) for calculating the gross primary productivity (GPP):

$$e^{-a_1 GPPtm} \times \cos(Z) = B_1 PAR + B_2 e^{-kwm} \times \cos(Z) + B_3 e^{-S/Q} + B_0 \quad (2)$$

where coefficients $B_1$, $B_2$, $B_3$ and $B_0$ respectively represent coefficients related to processes of PAR, the photochemistry, the scattering and a reflection at the top of the atmosphere or relative contributions to the gross primary productivity.

2-factor model of the gross primary productivity: the scattering term is not considered (in the formulas (1) and (2)).

The established calculation model (the formula (2)) is used to calculate the gross primary productivity and various errors (including average, absolute deviation, relative deviation, root mean square, standard deviation, etc.) between the calculated values and the measured values.

When the calculation deviation does not reach the expected effect (relative deviation <15%), the previous data screening and subsequent corresponding calculation are repeated until a satisfactory calculation result is achieved: calculating the relative deviation <15%, and the minimum calculation deviation (absolute deviation, relative deviation, root mean square, standard deviation, etc.).

In addition, each coefficient also needs to meet the conditions: the coefficients $B_1$, $B_2$, $B_3$ and $B_0$ of the 3-factor calculation model are positive, positive, negative and positive respectively; 2-factor calculation model coefficients $B_1$, $B_2$ and $B_0$ are all positive values.

This calculation model of gross primary productivity includes the calculation model of gross primary productivity for two atmospheric states (S/Q<0.5 and S/Q≥0.5), and different coefficients and constants are used for each atmospheric state, so as to comprehensively describe and calculate the gross primary productivity of the ecosystem under all weather conditions (including S/Q<0.5 and S/Q≥0.5). Using 3-factor and 2-factor gross primary productivity calculation models, relatively consistent gross primary productivity calculation values may be acquired, including average value and accumulated value; at the same time, all kinds of calculation errors are close.

This gross primary productivity calculation model is established based on PAR energy utilization, is suitable for the gross primary productivity calculation of various ecosystems and has a wide range of applications. It is necessary to determine the coefficients of each term (that is, related to each process) according to the measured data of the experimental station.

This embodiment has following advantages:

The calculation method of this embodiment may save a large number of parameters used in various common modes (complex and empirical) at present, reduce the great uncertainty (calculation error) of calculation results caused by having to use too many assumed parameters because many processes are unknown or inaccurate at present, and save calculation time and resources. Based on the principle of energy utilization, this calculation model may well describe and reveal the main processes (PAR, atmosphere, plants, land surface, etc.) involved in the change of the gross primary productivity of the ecosystems and the complex mechanism of their interactions. The empirical model clearly reveals the complex relationships between GPP and PAR, water vapor, scattered radiation and other control factors. These results are consistent with those of complex models widely used in the world. This calculation method is easy to be popularized and applied to all kinds of ecosystems. By using the daily measurement data of experimental stations and the calculation model of gross primary productivity, more accurate gross primary productivity of ecosystems may be obtained. According to the data of the experimental station (whether there is direct radiation or scattered radiation), the 3-factor or 2-factor calculation model may be flexibly used to easily acquire the calculation data of the gross primary productivity.

The gross primary productivity of the ecosystem involves many and very complex processes such as plants, soil, water, nutrition, atmosphere and their interactions. Many processes are not very clear at present, and there are many assumptions and parameterization schemes. The calculation method of this embodiment deals with the above related main processes based on the PAR energy method, so as to acquire an efficient and accurate calculation result about the gross primary productivity of the ecosystem.

Embodiment 2

1. The gross primary productivity of subtropical coniferous forest in China in 2013-2014 is calculated under the actual weather conditions (according to S/Q classification) by using the previously introduced method and the established gross primary productivity calculation model (note: synchronous data is used when developing an empirical model). The calculation results are as follows:

(1) Hourly Average Results (S/Q<0.5)

For the 3-factor model, the relative deviation (δ) between the calculated value and the measured value is 9.96%, the normalized mean square error (NMSE, $mgCO_2$ $m^{-2}$ $s^{-1}$) is 0.013, and the mean bias error (MAD, $mgCO_2$ $m^{-2}$ $s^{-1}$ and %) is 0.06 or 9.46%, and the root mean square error (RMSE, $mgCO_2$ $m^{-2}$ $s^{-1}$ and %) is 0.07 or 11.33%.

For the 2-factor model, the relative deviation (δ) between the calculated value and the measured value is 10.25%, the normalized mean square error ($mgCO_2$ $m^{-2}$ $s^{-1}$) is 0.016, the mean bias error ($mgCO_2$ $m^{-2}$ $s^{-1}$ and %) is 0.06 or 10.12%, and the root mean square error ($mgCO_2$ $m^{-2}$ $s^{-1}$ and %) is 0.08 or 12.55%.

(2) Hourly Average Results (S/Q≥0.5)

For the 3-factor model, the relative deviation (δ) between the calculated value and the measured value is 15.52%, the normalized mean square error ($mgCO_2$ $m^{-2}$ $s^{-1}$) is 0.035, the mean bias error ($mgCO_2$ $m^{-2}$ $s^{-1}$ and %) is 0.12 or 15.21%, and the root mean square error ($mgCO_2$ $m^{-2}$ $s^{-1}$ and %) is 0.15 or 18.74%.

For the 2-factor model, the relative deviation (δ) between the calculated value and the measured value is 16.20%, the normalized mean square error ($mgCO_2$ $m^{-2}$ $s^{-1}$) is 0.037, the mean bias error ($mgCO_2$ $m^{-2}$ $s^{-1}$ and %) is 0.13 or 15.66%, and the root mean square error ($mgCO_2$ $m^{-2}$ $s^{-1}$ and %) is 0.16 or 19.35%.

2. The gross primary productivity of subtropical coniferous forest in China in 2013-2016 is calculated under the actual weather conditions (S/Q<0.5 and S/Q≥0.5) by using the gross primary productivity calculation model. The calculation results are as follows:

(1) Hourly Average Results

For the 3-factor model, the relative deviation (δ) between the calculated value and the measured value is 142.74%, the normalized mean square error ($mgCO_2$ $m^{-2}$ $s^{-1}$) is 0.586, the mean bias error ($mgCO_2$ $m^{-2}$ $s^{-1}$ and %) is 0.318 or 70.03%, and the root mean square error ($mgCO_2$ $m^{-2}$ $s^{-1}$ and %) is 0.398 or 87.60%. The ratio of calculated value to measured value is 1.31.

For the 2-factor model, the relative deviation (δ) between the calculated value and the measured value is 135.55%, the normalized mean square error ($mgCO_2$ $m^{-2}$ $s^{-1}$) is 0.538, the $mgCO_2$ $m^{-2}$ $s^{-1}$ ($mgCO_2$ $m^{-2}$ $s^{-1}$ and %) is 0.303 or 66.62%, and the root mean square error ($mgCO_2$ $m^{-2}$ $s^{-1}$ and %) is 0.378 or 83.23%. The ratio of calculated value to measured value is 1.29.

(2) Annual Total Results

For the 3-factor model, the relative deviation (δ) between the calculated value and the measured value is 30.88%, and the ratio of the calculated value to the measured value is 1.41. For the 2-factor model, the relative deviation (δ) between the calculated value and the measured value is 28.57%, and the ratio of the calculated value to the measured value is 1.29.

The calculation results of daily, monthly and annual averages and daily, monthly and annual totals are similar to those of hourly values. The standard deviation of the calculated values (hourly, daily and monthly averages, etc.) of the empirical model is close to that of the measured values.

For the calculation of daily total, the comparison results between the empirical calculation model of gross primary productivity and the model widely used in the world are given, so as to fully understand and evaluate the calculation ability of the empirical model. Using 3-factor and 2-factor empirical primary productivities, the root mean square errors of gross primary productivity of subtropical coniferous forests in China are 3.55 and 3.44 gCm$^{-2}$ day$^{-1}$, respectively, and the average root mean square errors of 57 evergreen coniferous forests in the world calculated by Yale Interactive Biosphere (YIBs) model are 3.21 gCm$^{-2}$ day$^{-1}$, which are relatively consistent.

This embodiment has following advantages:

This embodiment puts forward a calculation method model of gross primary productivity of ecosystem based on PAR energy balance. Using a few input parameters (four, which may be obtained from the daily measurement of the current experimental station) and this calculation model, the more accurate and reliable calculation results of the gross primary productivity of the ecosystem are given, including the average and accumulated values of the hourly, daily, monthly, annual and multi-year scales, especially the reliable calculation results of the hourly scale (including the hourly average and accumulated values); the calculated standard deviation is very close to the measured standard deviation, and the calculated error (such as root mean square error RMSE) is also very consistent with the complex model widely used in the world.

The above is only the preferred embodiments of this application, but the protection scope of this application is not limited to this. Any change or replacement that may be easily thought of by a person familiar with this technical field within the technical scope disclosed in this application should be covered by this application. Therefore, the protection scope of this application should be based on the protection scope of the claims.

What is claimed is:

1. A method for calculating a gross primary productivity of an ecosystem, comprising following steps:
   acquiring key parameters of the ecosystem, and screening out standard parameters, wherein the key parameters comprise: a primary productivity, a solar altitude angle and an atmospheric column material content; and
   a process of screening out the standard parameters comprises:
   screening out the standard parameters according to screening conditions; wherein the screening conditions comprise: selecting primary productivity data with a standard deviation less than 2 times; selecting the solar altitude angle higher than 15 degrees; and a measured value of a photosynthetically active radiation less than a value of a top of an atmosphere;
   calculating factor parameter terms based on the standard parameters and ground water vapor pressure parameters, wherein the factor parameter terms comprise a photochemical term, a scattering term and a primary productivity term; and
   acquiring a calculation model of the primary productivity based on the factor parameter terms and according to an energy balance principle of the photosynthetically active radiation;
   and acquiring a calculated value of the gross primary productivity of the ecosystem by using the calculation model;
   wherein a process of acquiring the calculation model of the primary productivity comprises:
   acquiring a quantitative relationship between the photosynthetically active radiation on a horizontal plane above a canopy and the factor parameter terms according to the energy balance principle of the photosynthetically active radiation:

$$PAR = A_1 e^{-a_1 GPPtm} \times \cos(Z) + A_2 e^{-kwm} \times \cos(Z) + A_3 e^{-S/Q} + A_0 \qquad (1)$$

wherein coefficients $A_1$, $A_2$ and $A_3$ respectively represent values at the top of the atmosphere related to processes of the primary productivity, a photochemistry and a scattering, $A_0$ is PAR reflected by the top of the atmosphere, $a_1$ is an attenuation coefficient, GPP is the primary productivity, t is a sampling time, Z is a solar zenith angle, k is a water vapor absorption coefficient, m is an atmospheric mass, W is an atmospheric column water vapor content, and S and Q are a diffuse solar radiation and a global solar radiation respectively;

and acquiring the calculation model of the primary productivity by a transformation based on the quantitative relationship:

$$e^{-a_1 GPPtm} \times \cos(Z) = B_1 PAR + B_2 e^{-kwm} \times \cos(Z) + B_3 e^{-S/Q} + B_0 \qquad (2)$$

wherein coefficients $B_1$, $B_2$, $B_3$ and $B_0$ respectively represent coefficients related to processes of PAR, the photochemistry, the scattering and a reflection at the top of the atmosphere or relative contributions to the primary productivity.

2. The method for calculating the gross primary productivity of the ecosystem according to claim 1, wherein a process of acquiring the key parameters of the ecosystem comprises:
   acquiring variation laws and actual measurement data of photosynthetically active radiation parameters, meteorological parameters and primary productivity parameters, and selecting value intervals of the key parameters and parameters of an atmospheric state to acquire the key parameters of the ecosystem, wherein the atmospheric column material content is a quantitative value of the atmospheric state.

3. The method for calculating the gross primary productivity of the ecosystem according to claim 2, wherein the atmospheric state comprises a first atmospheric state and a second atmospheric state, wherein the first atmospheric state is an atmospheric column material content less than 0.5, and the second atmospheric state is an atmospheric column material content greater than or equal to 0.5.

4. The method for calculating the gross primary productivity of the ecosystem according to claim 1, wherein a process of calculating the factor parameter terms comprises:
   calculating the photochemical term based on the solar altitude angle and the ground water vapor pressure parameters; calculating the scattering term based on the atmospheric column material content; and calculating the primary productivity term based on the primary productivity.

5. The method for calculating the gross primary productivity of the ecosystem according to claim 3, wherein a process of acquiring the calculated value of the gross primary productivity of the ecosystem by using the calculation model comprises: calculating by the calculation model the gross primary productivity of the ecosystem respectively based on the first atmospheric state and the second atmospheric state.

6. The method for calculating the gross primary productivity of the ecosystem according to claim 2, after acquiring the calculated value of the gross primary productivity of the ecosystem, further comprising:
   acquiring a calculation deviation between a calculated value of the primary productivity and the actual measurement data by using the calculation model; judging the calculation deviation, if the calculation deviation is greater than a preset value, re-screening standard parameters; and if the calculated deviation is less than or equal to the preset value, acquiring the gross primary productivity of the ecosystem.

* * * * *